March 11, 1969      J. W. SOPER      3,432,227
KERATOMETER WITH ADJUSTABLE FIXATION TARGET ATTACHMENT
FOR DETERMINING CORNEAL TOPOGRAPHY
Filed Sept. 11, 1962      Sheet 1 of 3

INVENTOR
JOSEPH W. SOPER

BY *Arnold & Roylance*

ATTORNEYS

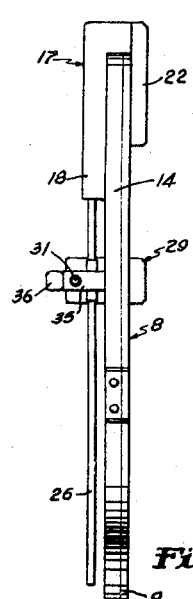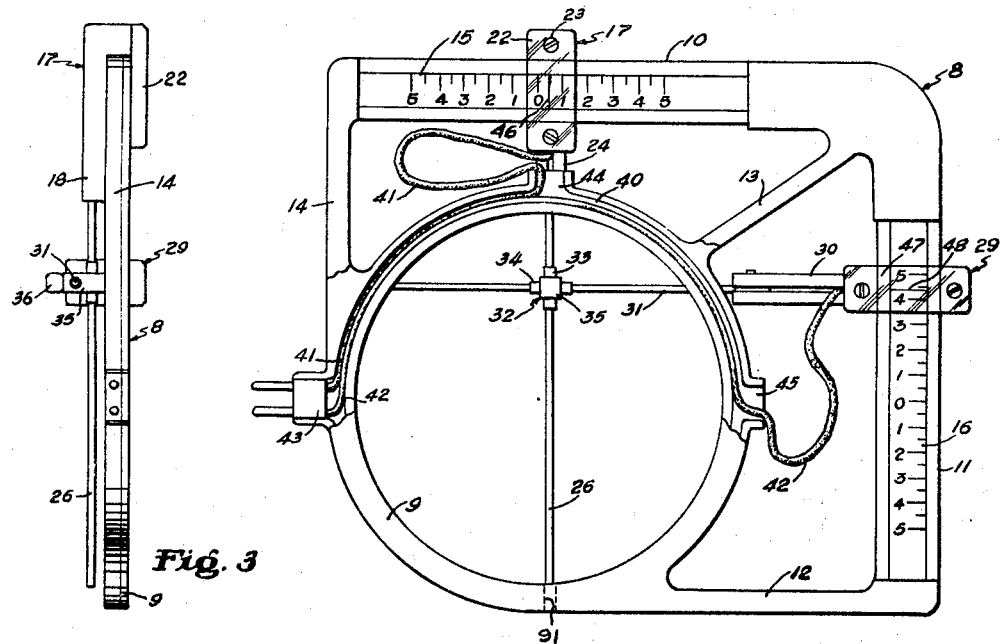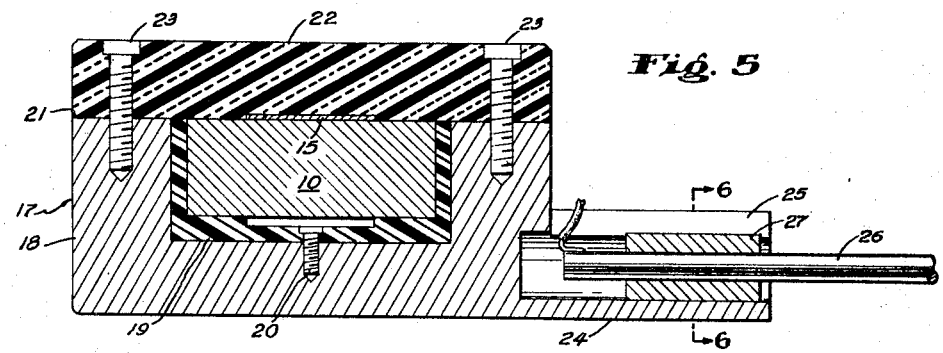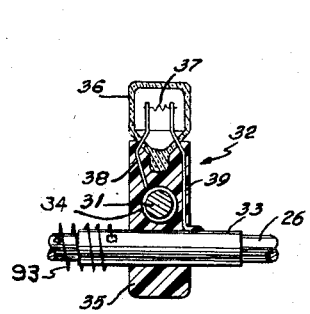
INVENTOR
JOSEPH W. SOPER

INVENTOR.
JOSEPH W. SOPER

United States Patent Office 3,432,227
Patented Mar. 11, 1969

3,432,227
KERATOMETER WITH ADJUSTABLE FIXATION TARGET ATTACHMENT FOR DETERMINING CORNEAL TOPOGRAPHY
Joseph W. Soper, c/o Soper Brothers, Inc., 234 Hermann Professional Bldg., Houston, Tex. 77025
Filed Sept. 11, 1962, Ser. No. 222,858
U.S. Cl. 351—13                    4 Claims
Int. Cl. A61b 3/10

This invention relates to the measurement of the corneal curvature of the eye and, more particularly, to an improved method and device enabling ophthalmologists to obtain further data on corneal topography of the eye with increased accuracy on an expedient clinical basis.

In determining corneal curvatures, ophthalmologists working at the usual clinical level have had to rely upon the use of conventional instruments of the general type described in U.S. Patent 1,750,931, issued Mar. 18, 1930, to Gustav A. H. Kellner et al., commonly called a keratometer. With such instruments, the patient focuses one eye on the reflected image of the same eye, this mirrored image serving as a fixation target which is kept stationary throughout the examination. Typically, the instrument provides an illuminated target mask that transmits two light beams for each primary meridian of the eye. The light beam strike the eye at points on the respective primary meridians, approximately 2 to 4 millimeters (mm.) apart. An image of the beams reflected from the eye is viewed by the instrument operator through a telescopic optical system so arranged as to derive, from the light beams reflected from the cornea, a fixed reference image and two adjustable images. The optical system is provided with an independent, calibrated adjusting means for adjusting the position of each adjustable image relative to the reference image in order that each adjustable image can be brought into alignment in a predetermined fashion with the reference image, the extent of the two adjustments being taken as measurement of the chordal distance between the points where the respective pair of light beams strike the eye. So long as the patient's eye sights its reflected image, the visual axis of the eye is centered relative to the optical axis of the optical system of the instrument. Thus, the keratometer is only useful for taking a single reading which gives approximate information as to corneal curvature in an area from approximately 2 to 4 mm. of the cornea through which the visual axis extends.

The need for accurate fitting of contact lenses requires more complete data on corneal topography. For a proper fit, the central posterior surface of a corneal contact lens must conform to the apical zone of the cornea, that is, to that area of the corneal surface over which the greatest corneal curvature in both primary meridians is regular or constant. In order to accomplish such conformity, the radius of curvature for each primary meridian in the apical zone must first be measured. Such measurements could be approximated by the clinical procedures of the prior art, employing the keratometer as discussed above, if it were safe to assume that, when the patient's eye sighted the fixation target of the keratometer, the visual axis of the eye would pass more or less centrally through the apical zone of the cornea.

The present invention is founded in part upon the discovery that the visual axis does not necessarily pass through a point on the cornea which is in the zone of greatest curvature. Clinical experience in development of the invention shows that in many patients, and particularly in cases of keratoconus, the visual axis of the eye is rather markedly decentered relative to the apical zone of the cornea. In such instances, the apical zone must be located, and the curvature therein measured, before truly satisfactory contact lenses can be made.

A general object of the present invention is to provide a method and means for determining, on an expedient clinical basis, more complete data on the topography of the cornea in sufficient detail and with such accuracy as to make it possible for the ophthalmologist to prepare better fitting corneal contact lenses.

Another object is to provide a method and means for developing, without the use of special scientific instruments, a more complete graphical representation of the location, extent, and curvature of the apical zone of the cornea, and the geometric center of the cornea, all in reference to the visual axis.

A further object is to provide a device, in the nature of an adjustable fixation target, which can be employed to adapt conventional ophthalmological instruments, such as the keratometer of the aforementioned Patent 1,750,-931, to carry out the method just referred to.

Yet another object is to devise an illuminated fixation target, for keratometers and like ophthalmological instruments, which makes possible the taking of a series of keratometric readings along a given meridian of the eye.

In order that the manner in which these and other objects are attained in accordance with the invention can be understood in detail, reference is had to the accompanying drawings, which form a part of this specification, and wherein:

FIGS. 2–4 are front, side and rear elevational views, respectively, of the device of FIG. 1;

FIG. 5 is a sectional view taken on line 5—5, FIG. 2;

FIG. 6 is a sectional view taken on line 6—6, FIG. 5;

FIG. 7 is a fragmentary sectional view illustrating details of an adjustable light source employed in the device of FIG. 1;

Figure 1:
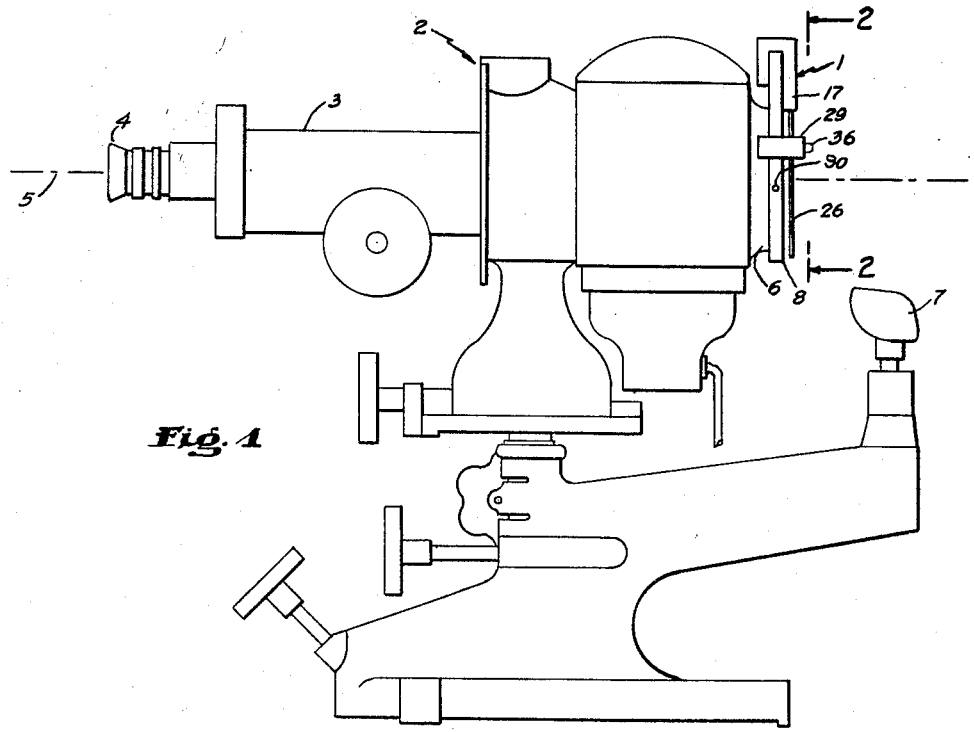
FIG. 1 is a side elevational view illustrating a device constructed in accordance with one embodiment of the invention nad applied to a conventional keratometer.

In accordance with the method of this invention, an initial keratometric reading is taken with the visual axis of the patient's eye centered on the axis of keratometric observation, e.g., the optical axis of a conventional keratometer, this initial reading being taken as the point of intersection of two meridians of the eye. This initial reading is made while the eye is focused on a fixation target centered on the axis of observation, the target being the usual reflected image of the patient's eye, or an illuminated target constructed in accordance with the teachings of this invention, but modified to prevent blocking of the light beams transmitted to the eye, as by off setting the supports for the target in its zero position.

Once the initial reading has been taken, the fixation target is then moved successively further in one direction to any number of positions along one of the meridians, so that the patients' eye follows the adjusted positions of the fixation target, and a plurality of keratometric readings are taken, one for each position of the fixation target, until the readings indicate that the corneal curvature along the meridian has commenced to become flatter or steeper. If the curvature becomes steeper this implies that the apical zone in this meridian is not over the visual center.

The amount of decentration along the primary meridian over which the steepest curvature first begins to flatten, outlines the apical zone. The readings can continue until the flattest curvature of the cornea is noted, corresponding to the limbus—the point before the junction of the sulcus.

The fixation target is then returned to its zero position and moved successively further in the opposite direction along the same meridian, readings again being taken at each position of the fixation target until flattening or a sharp rise of the corneal curvature is again detected, and the limbus located. This procedure is then repeated with the fixation target shifted along the other meridian. As a result, important data can be obtained, including four critical points that indicate where flattening of the corneal curvature commences and the points locating the limbus.

The data obtained by the above method can be utilized in several ways. The results immediately alert the opthalmologist to the fact that the patient's contact lenses cannot be prepared using the assumption that the apex substantially coincides with the visual axis. The data on the curvature along the primary and other meridians can be plotted to assist in more accurately matching the posterior contour of the contact lens with the cornea.

One type of valuable information derived from the resultant data is the outline of the apical zone in reference to the visual axis. To obtain this information, a graph is used consisting of concentric circles representing positions of decentration from the visual axis of the eye (the center of the circles representing the visual axis). The meridians are represented as lines crossing the center of the concentric circles. The point along each side of a primary meridian where the curvature first begins to flatten is plotted, e.g. at 90 degrees from the vertical on the graph the point occurred at 2 mm., 180 degrees at 1½ mm., 270 degrees at 2 mm., and 360 degrees at 1 mm. The line circumscribing these graph points gives the limiting margin which encloses the apical zone. By noting the curvature between the points on each primary meridian, the range over which the steepest curvature is constant is shown. The visual center in this example is contained within the apical zone.

The same type of graph can be used to plot an apical zone completely displaced from the visual center. Data on the limiting margin on other meridians can be secured, once it is evident from measurements along the primary meridians that the apical zone is substantially displaced.

The geometric center of the cornea can be determined and plotted on the same graph. The mid-point of the line drawn between limbus points on a primary meridian is the geometric center.

The methed thus involves successive positioning of a movable fixation target in such fashion that the eye of the patient is caused to move successively further in each direction from a zero point, along two meridians, while keratometric observations are taken at each position, to obtain data on a corneal curvature. Since the procedure commences with the visual axis of the patient's eye centered on the zero position for a fixation target, the locations of the points on the cornea beyond the limiting margin for which curvature data is developed are positively known with reference to the visual axis.

Turning now to apparatus embodiments of the invention, FIG. 1 illustrates an adjustable fixation target unit 1, constructed in accordance with one embodiment of the invention, installed on a conventional keratometer 2 of the type described in aforementioned Patent 1,750,931. The details of construction of the keratometer 2 are explained in that patent and are well known to those skilled in the art, so that detailed description of the keratometer is unnecessary here. For purposes of reference, however, it is to be noted that the keratometer includes the usual optical system, housed in casing 3 and embodying the observer's eyepiece 4, the arrangement being such that the optical axis of observation extends as indicated at 5. The circular cell 6, threaded into the housing of the instrument at the patient's end thereof, carries the target of the optical system. The patient's chin rest is indicated at 7 and can be positioned so that the eye of the patient will be centered with respect to the optical system of the instrument.

On the outsides of cell 6 are cylindrical spotting poles 90 consisting of a short rod threaded at one end into the side of cell 6 and diametrically extending outward from the outside of cell 6 in the horizontal plane to align the eyes.

In this embodiment of the invention, the fixation target unit 1 comprises a rigid frame structure, indicated generally at 8, including a circular portion 9 of such diameter as to snugly embrace the periphery of the cell 6 of the keratometer, so that the unit 1 is supported on the keratometer by engagement of portion 9 with cell 6. The spotting poles 90 are used to conveniently attach the fixation target 1. The spotting poles 90 are unscrewed, inserted in appropriately located holes 91 in portion 9 and tightened to firmly hold the fixation target 1 in place. One of holes 91 is shown in dotted lines in the embodiments of FIGS. 2 and 4. Frame unit 8 also comprises a pair of straight arms 10 and 11 which extend at right angles to each other and are rigidly attached to circular portion 9 by connecting arms 12, 13 and 14.

Arms 10 and 11 include portions which are of uniform rectangular transverse cross section and of such length as to extend for more than one complete diameter of the interior opening of circular portion 9. Fixed to that surface of arm 10 which faces the observer when the unit is installed in the manner seen in FIG. 1 is a calibrated scale 15. Similarly, a scale 16 is fixed to the corresponding surface of arm 11.

Main arm 10 carries a slide indicated generally at 17 and comprising a metal body 18 provided with a rectangular notch which is materially larger than the transverse cross section of arm 10. A U-shaped body 19, of nylon or other suitable synthetic resin material, is seated in the notch in body 18, being secured by screw 20. Body 19 is of such configuration and size as to completely fill the space between the arm 10 and the walls of the notch in the metal body 18, the arrangement being such that the surface of arm 10 which carries scale 15 is maintained in the same plane as the major face 21 of body 18. A transparent, rigid plate 22, suitably recessed to freely accommodate scale 15, is secured to the major face 21 of body 18, as by screws 23. As seen in FIG. 5, one face of plate 22 engages not only the face 21 of body 18 but also the ends of the leg portions of body 19 and the corresponding face of arm 10. Advantageously, the plate 22 can be formed of a suitable methyl methacrylate polymer.

The combination of body 19 and plate 22 serves both as a slide bearing and as electrical insulating means for isolating the arm 10 from the metal body 18.

Body 18 includes an integral, generally tubular portion 24 which projects toward the circular portion 9 of the frame unit. Portion 24 is open at its tip and is provided with a longitudinally extending, outwardly opening slot 25. A straight, stiff, electrically conductive cylindrical rod 26 of small diameter has one end disposed in the bore of portion 24. This end of rod 26 extends through a metal sleeve 27 frictionally embraced by portion 24 and provided with a threaded, radially extending opening which accommodates a screw 28. Screw 28 extends through a suitable opening in the wall of tubular portion 24 so as to be adjustable to clamp rod 26 rigidly to portion 24, as will be evident from FIG. 6. The arrangement is such that rod 26 is coaxial with the bore of portion 24 and projects parallel to the common plane of main arms 10 and 11. As will be clear from FIGS. 3 and 5, rod 26 extends parallel to the plane of circular portion 9 but is spaced therefrom so that, as the slide 17 is moved along arm 10, rod 26 is free to move across the circular area enclosed by portion 9 of the unit.

A second slide 29 is provided on main frame arm 11, slide 29 being constructed precisely as hereinbefore described with reference to slide 17, save that the main body of the slide is deeper, so that its tubular portion 30 is spaced substantially further from the plane of circular portion 9 than is portion 24 of slide 17. A stiff, cylindrical, electrically conductive rod 31 of relatively small diameter, identical to rod 26, is rigidly fixed in portion 30 of slide 29, in the same manner hereinbefore described with reference to the mounting of rod 26. Rod 31 projects at right angles from arm 11 and therefore extends at right angles across rod 26. As will be clear from FIG. 3, the relative dimensions of slides 17 and 29 are such that rods 26 and 31 project close to one another.

Rods 26 and 31 slidably support a lamp unit indicated generally at 32 and illustrated in detail in FIG. 7. Unit 32 includes a brass or like electrically conductive rigid sleeve 33 of such diameter as to closely embrace the rod 26. The unit also includes a similar sleeve 34 which slidably embraces rod 31. Sleeves 33 and 34 are embedded in and rigidly supported by a molded body 35 of suitable electrical insulating material. Also embedded in body 35 and mechanically supported thereby is a sub-miniature incandescent electric lamp 36 including an incandescent filament 37 and leads 38 and 39. Lead 38 extends through body 35 to sleeve 34 and is soldered or otherwise suitably electrically connected thereto. Similarly, lead 39 extends through body 35 to sleeve 33 and is connected electrically to that sleeve.

It will thus be seen that the combination of sleeves 33 and 34 and body 35 serves both to support the lamp 36 adjustably on rods 26 and 31 and to connect the leads of the lamp electrically each to a different one of the two supporting rods. A positive electrical contact with lamp 36 is assured by a coil spring 93 concentrically disposed about rod 26 and connected, as by soldering, to sleeve 33. The coil spring 93 permits rod 26 to move through sleeve 33 while maintaining electrical contact with rod 26 to eliminate any possibility of poor contact in some positions of the lamp unit. The same type of positive contact arrangement is used for rod 31 and sleeve 34.

As seen in FIG. 4, circular portion 9 of frame unit 8 is formed in two parts and provided with an internal channel 40 which accommodates portions of insulated conductors 41 and 42. Frame portion 9 is formed with a radial projection 43 housing the insulated body of a twin-pronged male connector 43 to which like ends of conductors 41 and 42 are connected. Frame portion 9 includes a radial opening, adjacent slide 17, and conductor 41 extends therethrough, the free end of conductor 41 being soldered or otherwise electrically connected to the end of rod 26 at slide 17, as indicated in FIG. 5. Between frame portion 9 and slide 17, conductor 41 extends in a loop to allow freedom of movement for the slide along arm 10. Portion 9 is provided with a second radial opening 45 directed toward arm 11 and through which conductor 42 extends, the free end of conductor 42 being electrically connected to the end of rod 31 at slide 29. Conductor 42 extends in the form of a loop between opening 45 and slide 29, affording freedom of movement of the slide. Energizing current for the lamp 37 is supplied via a suitable 2-conductor insulated power cord (not shown) equipped with a female plug cooperating with connector 43. Thus, it will be evident that provision is made for constant energization of lamp 36 regardless of the adjusted positions of rods 26 and 31, as determined by movement of the slides 17 and 29, respectively.

The transparent plate 22 of slide 17 is scribed with a reference line, as indicated at 46, FIG 4, to cooperate with scale 15. Similarly, the transparent plate 47 of slide 29 is scribed with a reference line, as indicated at 48, FIG. 4, to cooperate with the scale 16 on arm 11. Scales 15 and 16 are identical, being graduated in steps of 0.5 mm. for example, with a zero point aligned on that diameter of the inner periphery of frame portion 9 which extends at right angles to the respective one of arms 10 and 11. Thus, as seen in FIG. 4, scale 15 allows the operator to move slide 17, and therefore rod 26, in half-millimeter steps, both to the left and to the right of the center of the circle defined by frame portion 9, considering the device as it is viewed in FIG. 4. Similarly, scale 16 and reference line 48 allow the operator to move slide 29, and therefore rod 31, in half-millimeter steps both upwardly and downwardly from the center of the circular area defined by portion 9 of the frame unit. When reference lines 46 and 48 are registered with the zero points of scales 15 and 16, it will be understood that rods 26 and 31 cross each other at the precise center of the circle defined by frame portion 9 and therefore cross at the optical axis of the keratometer 2 when the device is installed in the fashion seen in FIG. 1.

Figure 2:
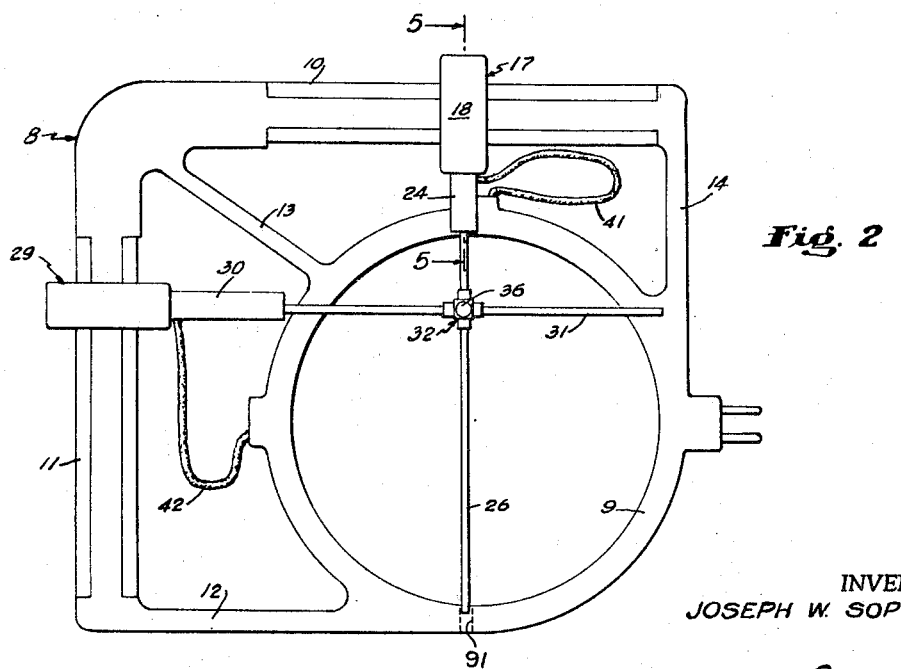

As will be clear from FIGS. 2 and 7, the lamp unit 32 is so constructed and arranged that, when the device is mounted on the keratometer, the lamp 36 is disposed between the patient, on the one hand, and the rods 26, 31 on the other hand. Also, the lamp 36 is centered on the point where rods 26 and 31 cross. Accordingly, since the point at which the two rods cross is universally adjustable over the entire area enclosed by circular frame portion 9, the location of lamp 36 is similarly adjustable. Calibrated scales 15 and 16, cooperating with reference lines 46 and 48, respectively, provide a means for indicating precisely the position of the cross-over point of the rods, and therefore the position of lamp 36, relative to the center of the circular area defined by frame portion 9. It will be obvious that the slides 17 and 29 can be so adjusted initially that their reference lines 46 and 48 coincide with the zero calibrations of scales 15 and 16, respectively, so that the lamp 36 will be positioned precisely at the center of frame portion 9 and, therefore, precisely on the optical axis of the keratometer, when the unit is mounted in the fashion seen in FIG. 1. Thereafter, the operator can move slide 17 in successive steps to cause the lamp to depart from its central or zero point. For example, this movement may first be accomplished in a left-hand direction, as the device is viewed in FIG. 2, until an adequate departure for the purpose of the test has been accomplished. Thereafter, the same procedure can be followed but with a right-hand departure from the center. Then, the slide 29 can be similarly manipulated to cause a departure upwardly and downwardly, as viewed in FIG. 2. Finally, it will be obvious that adjustment of both slides is effective to move the lamp to any selected point, within frame member 9, so that it is unnecessary to limit the adjustments to particular meridians.

Figure 8:
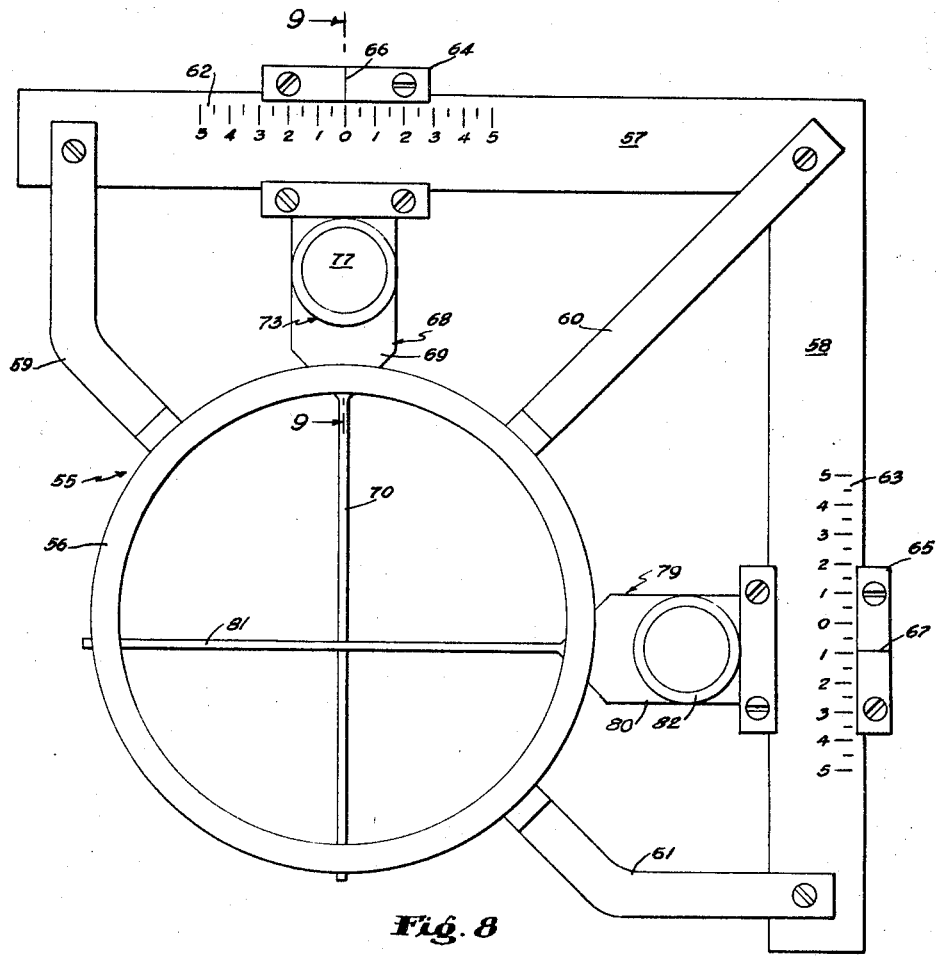
FIG. 8 is a rear elevational view of a device constructed in accordance with another embodiment of the invention.
Figure 9:
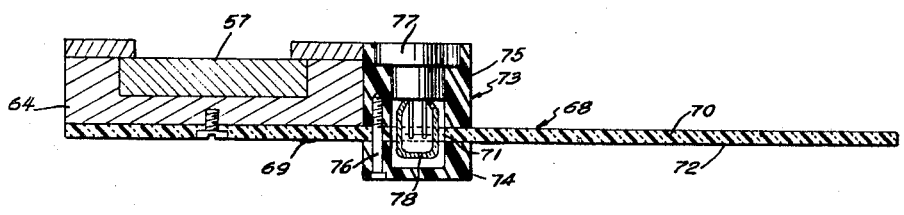
FIG. 9 is a sectional view taken on line 9—9, FIG. 8.

The embodiment of FIGS. 1–7 is advantageous because the lamp 36 provides a single illuminated point as the fixation target. The embodiment illustrated in FIGS. 8 and 9 provides an alternative form of target wherein the fixation point is determined by the crossing of two illuminated rods. Here, the device again embodies a frame unit, indicated generally at 55, comprising a circular portion 56. Main arms 57 and 58, extending at right angles to each other, are formed from a single, integral metal piece and are connected to circular portion 56 by arms 59, 60, and 61. Circular portion 56 is of course constructed to embrace the cell 6 of the keratometer 2 as hereinbefore described with reference to the embodiment of FIGS. 1–7.

The surface of main arm 57 which is directed toward the operator, when the unit is properly mounted on the keratometer, is provided with a calibrated scale 62. Main arm 58 has a similar calibrated scale 63. As seen in FIG. 8, the scales are each centered on that diameter of the circle of frame portion 56 which extends at right angles to the corresponding arms 57, 58. Again, the scales are so calibrated that their zero points are in line with diameters of the circle defined by frame portion 56.

A slide 64 is mounted on main arm 57 and main arm 58 carries a similar slide 65. Slide 64 is provided with a reference line 66. A reference line 67 is provided on slide 65. Slide 64 can be adjusted in either direction along arm 57 to bring reference line 66 into alignment with the various calibrations of scale 62. Similarly, slide 65 is movable in both directions along arm 58, the extent of movement being determined by the position of reference line 67 relative to the calibrations of scale 63.

Fixed rigidly to that face of slide 57 which is directed toward the patient is an optically conductive member indicated generally at 68. Formed of a methyl methacrylate polymer or other suitable transparent material having good "light piping" characteristics, member 68 comprises the enlarged flat end portion 69 and an elongated, thin, rod-like portion 70. The enlarged portion 69 overlies slide 64 and is of sufficient length to project beyond slide 64, joining rod-like portion 70 at approximately the circumference of circular portion 56 of the frame unit. Thus, part of the enlarged portion 69 is disposed between slide 64 and frame portion 56. In this part of portion 69, member 68 is provided with a circular opening 71, FIG. 9. Rod-like portion 70 of member 68 is of such length, and is so positioned, as to extend completely across the circular area defined by frame portion 56. The edge surface 72 of rod-like portion 70 which faces the patient is roughened throughout the length of portion 70. The other surfaces of member 68 are smooth, plane surfaces.

Carried by member 68 is a lamp housing indicated generally at 73 and comprising a cup-like portion 74 and a generally cylindrical portion 75 arranged each on a different side of the exposed part of enlarged end portion 69 of member 68. A single screw 76, extending through a bore in the wall of portion 74 and threadably engaged in a bore in the wall of portion 75, serves to secure the two parts of the lamp housing together with portion 69 of member 68 interposed therebetween. From FIG. 9, it will be seen that the wall of opening 71 combines with the inner surfaces of portions 74 and 75 of the lamp housing to define a chamber which is closed at one end by the end wall of portion 74 and which opens through portion 75.

The open end of portion 75 of the lamp housing receives a combined closure and lamp socket 77. Socket 77 supports a miniature incandescent lamp 78 in such fashion that the filament of the lamp is centered within opening 71 of member 68. Lamp 78 is supplied with energizing current via a suitable two-conductor lead (not shown) which is so arranged as to afford freedom of movement for slide 64 along arm 57.

Portions 74 and 75 of lamp housing 73 are of opaque electrical insulating material, and it will be understood that the combined closure and lamp socket 77 completely fills the end of portion 75 and blocks the escape of light therefrom. Accordingly, light emanating from the filament of lamp 78 enters the optically conductive member 68 and a portion of the light is conducted, by reason of internal reflection, along the rod-like portion 70. Since edge surface 72 is roughened, light escapes from this surface over the entire length of rod-like portion 70 so that, as viewed by the patient's eye, rod-like portion 70 appears as an illuminated straight line extending across frame portion 56 and, therefore, across the cell 6 of the keratometer.

A second optically conductive member 79, identical to member 68, is fixed to slide 65 in the same fashion just described with reference to member 68. Slide 64 is thicker, in a direction axially of ring 56, than is slide 65. Hence, optically conductive member 79 lies in a plane which is spaced from the plane of member 68. Member 79 includes an enlarged end portion 80 and an elongated rod-like portion 81. Enlarged portion 80 is provided with an opening (not shown) which is identical with opening 71 and which allows light, provided by an incandescent lamp (not shown) enclosed in housing 82, to enter rod-like portion 81. The edge surface of rod-like portion 81 which is directed toward the patient, when the unit is mounted on the keratometer in the fashion indicated in FIG. 1, is roughened throughout its length so that, when the lamp in housing 82 is energized, light emanates from the roughened surface and causes the rod-like portion 81 to appear, to the patient, as an illuminated straight line extending across the circular area enclosed by frame portion 56.

The adjustable nature of slides 64 and 65, and the provision of scales 62 and 63, with the respective reference lines 66 and 67 on the slides, allows the operator to shift the positions of rod-like portions 70 and 81 across the area encircled by frame portion 56 in order to locate the cross-over point of the two portions 70 and 81 at any desired position within the circle. It will be obvious that this cross-over point will appear to the patient as a suitable fixation target and can be adjusted by the operator in the same fashion hereinbefore described with reference to the embodiment shown in FIGS. 1–7.

While two advantageous embodiments of the invention have been shown and described for illustrative purposes, it will be understood that various changes and modifications can be made therein without departing from the scope of the invention.

What is claimed is:

1. In a device for surveying a human cornea and including a keratometer having
   a projecting circular cell member;
   a fixed optical target for establishing the visual axis of the cornea;
   optical means interconnected with said cell member for establishing an optical axis coincident with said visual axis;
   illuminating means for establishing a pair of spaced-apart reference locations on said cornea each spaced a preselected distance from said visual axis; and
   measuring means for determining the length of the chordal distance between said two reference locations on the cornea;
   the improvement in combination therewith comprising
   a support frame for connection with said circular cell member and having an open circular portion to be concentrically positioned about said visual and optical axes;
   first and second symmetrical scales mounted on said frame at right angles to each other and spaced from said circular portion,
      said symmetrical scales each having a centrally located reference point horizontally and vertically aligned with said visual and optical axes;
   first and second indicator support members slidably mounted on said frame for respective movement along said first and second scales for indicating on a respective one of said scales the position of each of said indicator support members with respect to said optical and visual axes; and
   first and second perpendicularly interesting indicator arms fixed respectively to and projecting from said first and second indicator support members to establish a selectively variable fixation point observable within said circular portion of said frame and selectively spaced from said optical axis for decentering said visual axis of the cornea from said optical axis.

2. The improvement apparatus described in claim 1, wherein said apparatus further comprises illumination means for illuminating said fixation point.

3. The improvement apparatus described in claim 2, wherein
   said indicator arms are constructed of an electrically conductive material, and
   wherein said illumination means includes
      a source of electrical energy connected to said electrically conductive indicator arms; and
      lamp means slidably mounted on said first and second electrically conductive indicator arms and contacting said arms for connecting said lamp means with said source of electrical energy for illuminating said crossing point of said arms.

4. The improvement apparatus described in claim 2, wherein
   said indicator arms are constructed of a light transmitting material, and wherein said illumination means includes
a light source adapted for transmitting light to
said light transmitting indicator arms for illuminating said crossing point of said arms.

References Cited

UNITED STATES PATENTS

| | | | |
|---|---|---|---|
| 1,115,408 | 10/1914 | De Zeng | 351—23 |
| 1,721,208 | 7/1929 | Currier et al. | 351—23 |
| 1,750,931 | 3/1930 | Kellner et al. | 351—10 |
| 2,395,351 | 2/1946 | Sohn | 346—29 X |
| 2,765,702 | 10/1956 | Sachtleben | 351—1 |
| 2,803,990 | 8/1957 | MacKnight | 351—23 |
| 2,250,521 | 7/1941 | Boeder | 351—40 |
| 2,977,177 | 3/1961 | McLaughlin et al. | 346—8 |
| 3,183,519 | 5/1965 | Harris et al. | 351—17 |
| 2,081,969 | 6/1937 | Allen et al. | 351—1 |

FOREIGN PATENTS 179,524   9/1922   Great Britain.

OTHER REFERENCES

"Jessop's Peripheral K Disc," article in Contacto, vol 6, No. 3, March 1962, p. 81 cited, re 1.C6.

Bronstein: "Peripheral Corneal Measurements," article in CLAO Papers, vol. 3, No. 1, January 1961, pp. 1 and 2 cited.

Jessop: "Corneal Topography," article in CLAO Papers, vol. 3, No. 3, March 1961, pp. 3–7 cited.

Koetting: "Toroidal Base Curves," article in CLAO Papers, vol. 3, No. 2, February 1961, pp. 3–8 cited.

DAVID H. RUBIN, *Primary Examiner.*

U.S. Cl. X.R.

351—6, 40